O. A. BRIDGES.
APPARATUS FOR SEVERING MOLTEN GLASS.
APPLICATION FILED JUNE 28, 1915.

1,207,363.

Patented Dec. 5, 1916.
2 SHEETS—SHEET 1.

WITNESSES
J. Herbert Bradley.
Ella McConnell

INVENTOR
O. A. Bridges

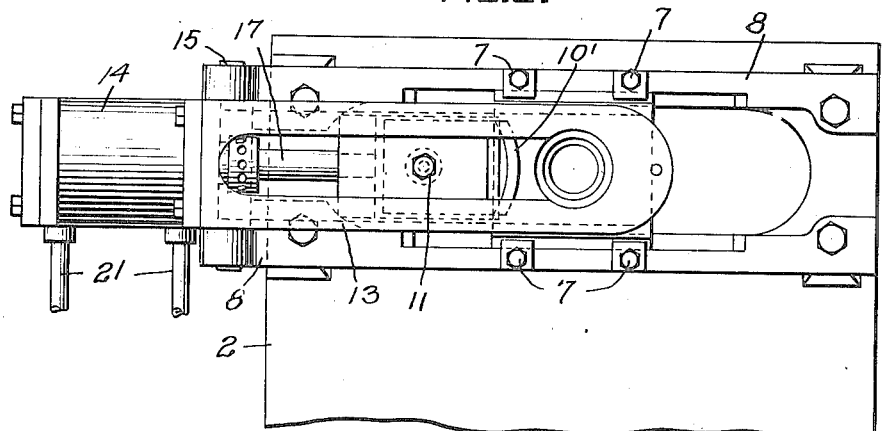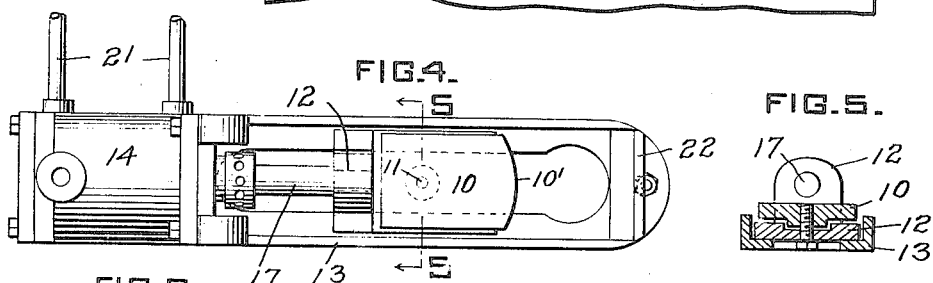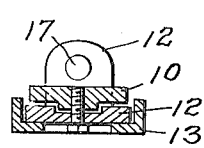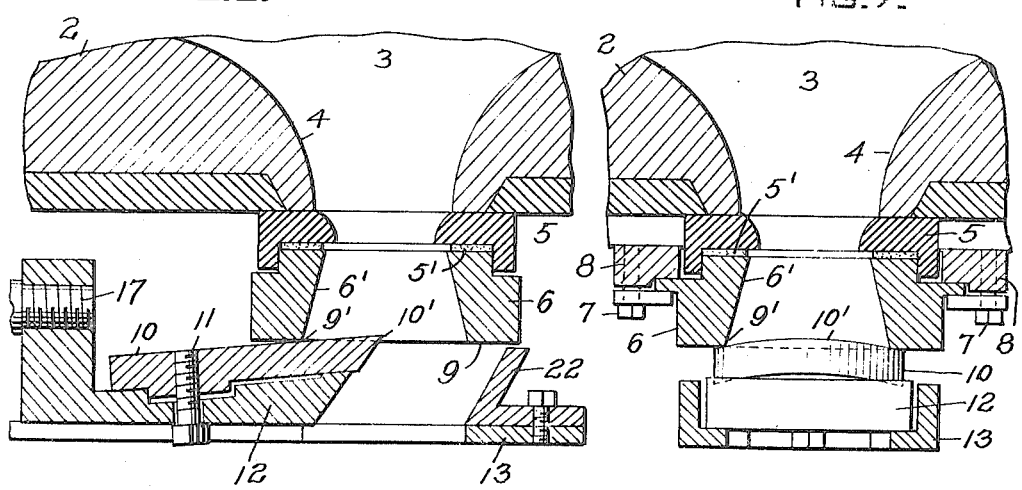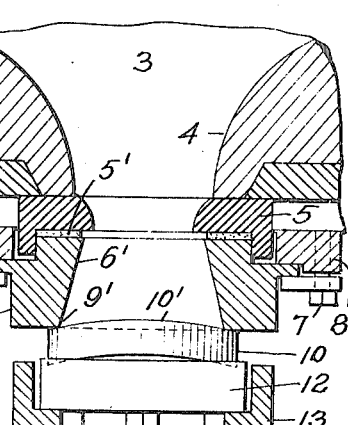

ably connected to bracket 14 mounted upon

UNITED STATES PATENT OFFICE.

ORVILLE A. BRIDGES, OF ZANESVILLE, OHIO, ASSIGNOR OF ONE-HALF TO THE KEARNS-GORSUCH BOTTLE COMPANY, OF ZANESVILLE, OHIO, A CORPORATION OF OHIO.

APPARATUS FOR SEVERING MOLTEN GLASS.

1,207,363.  Specification of Letters Patent.  Patented Dec. 5, 1916.

Application filed June 28, 1915. Serial No. 36,599.

*To all whom it may concern:*

Be it known that I, ORVILLE A. BRIDGES, a citizen of the United States, and resident of Zanesville, in the county of Muskingum and State of Ohio, have invented certain new and useful Improvements in Apparatus for Severing Molten Glass, of which the following is a specification.

This invention relates to delivering molten glass from a tank furnace or other container, and has particular reference to mechanism of simple and efficient construction for shearing or severing the discharging glass stream into quotas of desired amount for molding or other manipulation incident to giving the glass commercial form. The glass is discharged from the container by gravity and the arrangement of the improved mechanism is preferably such that the relatively slow flowing stream may be divided as required without interrupting its flow.

A further purpose is to provide an improved shear mechanism, together with improved means for maintaining the shear parts or elements in effective shearing relation.

Figure 1:
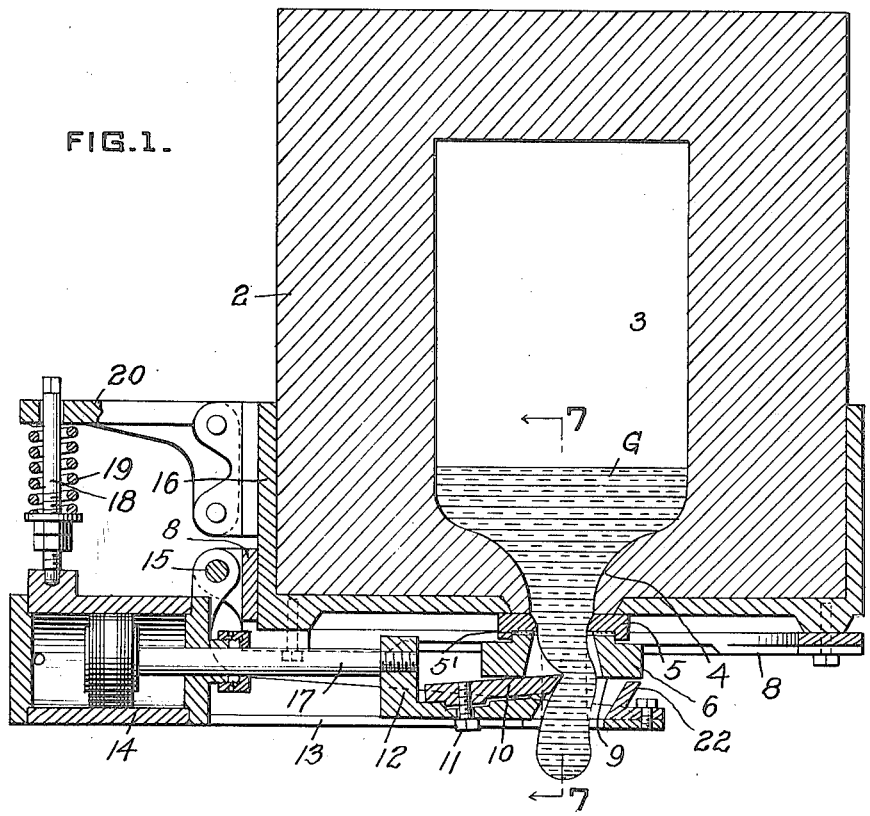
Figure 2:
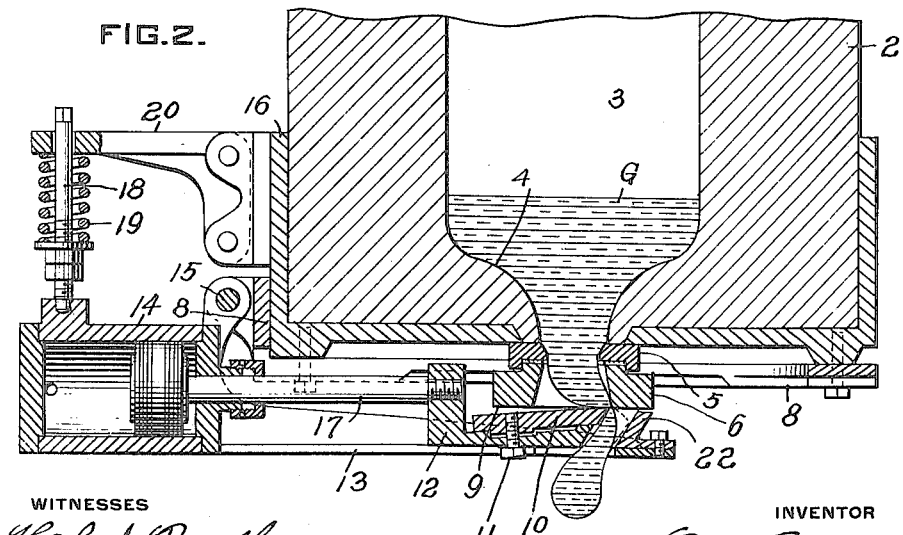

In the accompanying drawings, Figures 1 and 2 are views in vertical section of the improved mechanism shown in position relatively to the discharging extension of a glass melting tank or furnace, the shear mechanism being shown in Fig. 1 at the inception of the shearing operation, and in Fig. 2 at the completion thereof. Fig. 3 is a bottom plan of the improved mechanism. Fig. 4 is a top plan of the carrier for the movable shear part with the latter shown thereon. Fig. 5 is a cross section on line 5—5 of Fig. 4. Figs. 6 and 7 are views drawn to a larger scale illustrating the coöperation of the shear parts, Fig. 6 being a longitudinal section with the parts in approximately the position shown in Fig. 1, and Fig. 7 a vertical cross-section on line 7—7 of Fig. 1.

Referring to the drawings, 2 designates an extension of a tank furnace, not shown, having its interior 3 in communication with the furnace and from which the plastic glass G is discharged by gravity through the bottom outlet opening 4. Beneath and forming a downward continuation of opening 4 is ring 5 which is formed of refractory material and which defines the size or capacity of the outlet. The glass stream is maintained in flowing engagement with ring 5, but with the latter of refractory material no chilling or other harmful effect can result.

Beneath and preferably supporting ring 5 is the fixed shear block 6 which comprises a downward continuation of the laterally inclosed passage for the discharging glass. The block may be maintained in proper relation to outlet 4 by stud bolts 7, so that the block may be adjustably secured to fixed frame 8 at the under side of furnace extension 2 as clearly shown in the several views, particularly Figs. 3 and 7. The bore 6' of block 6 is preferably somewhat larger than the passage through ring 5 and is of truncated cone form with its smallest diameter uppermost. Block 6 is formed of metal, and the passage therethrough is of such size as not to engage the descending column of glass, thereby forestalling chilling. During the shearing operation presently to be described, there is slight engagement between the plastic glass and the block, but the engagement is so slight as not to impair the glass. The bottom surface 9 of block 6 is flat and constitutes a shearing face through which bore 6' opens. A gasket 5' of asbestos or other suitable material is preferably interposed between ring 5 and block 6.

Coöperating with block 6 is the knife-like shear part 10 which has its curved cutting edge 10' traversing bore 6' of shear block 6 and coöperating with face 9 of the latter in such manner as to effectively shear or sever the glass. Shear part 10 is preferably maintained at such an angle to shearing face 9 that the curved advancing edge of the movable shear performs its function in conjunction with the corners or edges 9' of surface 9, as clearly shown in Fig. 7. With the shear parts maintained in this relation, the curved cutting edge 10' projects slightly above surface 9 and into bore 6' as shown in Figs. 6 and 7, whereby the initial portion of the cut is made well up within block 6 and before any serious chilling effect can possibly ensue. While the central portion of cutting edge 10' has a knife-like severing action on the glass, the effective shearing and final severance is accomplished by the shearing coaction of edge 10' with corners or edges 9' of the fixed shear block.

Knife 10 is secured by bolt 11 to a head 12 which is slidable on the upper surface of the slotted arm-like support 13, in the adaptation here shown said support being rigid with a cylinder 14 and with the support pivotally supported at 15 to the fixed frame 8. The piston of cylinder 14 is connected by rod 17 with head 12 whereby the latter is reciprocated for moving knife 10 through its shearing strokes. The arrangement is such that support 13 maintains shear part 10 at an angle oblique to the under face 9 of shear block 6, thereby holding cutting edge 10' pressed upwardly into effective shearing engagement with said surface 9, and particularly its corners or edges 9'. To maintain this relation of the parts a tension device is provided for the pivoted support which is here embodied in stem 18 projecting upwardly from cylinder 14 and with spring 19 confined on the stem beneath bracket 20, the latter secured to casing 16. By this simple expedient the parts are maintained in effective shearing relation without interfering with the operation in any particular.

Air or other fluid under pressure may be admitted and exhausted to opposite ends of cylinder 14 through pipes 21 whereby part 10 may be reciprocated with the desired frequency, also by means of which the operation of the glass severing mechanism may be coördinated with a machine for manufacturing bottles or other articles to which the severed quotas of glass are delivered at regular intervals by molds presented therebeneath. Glass forming machines of this general type are well known, and the foregoing reference to this adaptation of the severing mechanism will be well understood by those skilled in the art. It will be understood, however, that the severing mechanism may be used in any desired connection and without regard to the use to which the severed glass is put nor to the manner of manipulating it after it has been severed.

In Fig. 1, the dotted lines indicate the normal path of the discharging stream of semi-fluid or plastic glass and in full lines the approximate position of the movable cutter is shown during the preliminary portion of the cutting operation. In Fig. 2 the movable shear part has completed its traverse and it is only at such times that the glass is engaged with any portion of the block 6, and even then only momentarily or until the glass can resume its normal downward flow indicated by the dotted lines of Fig. 1. This engagement with the metal shearing block is so slight that no injury can result. As the lower portion of the column is finally severed, it falls gently against baffle 22 at the outer end of support 13 and finally drops into the molds or other device arranged to receive it.

It will be understood that the rate of flow of the discharging glass column will depend on the plasticity of the glass, its mobility increasing with its temperature. But in any case, the operation of the movable cutter 10 is preferably such as not to substantially interrupt the continuity of the downward flow into shear block 6, the flow into the latter being continuous and the shearing mechanism operating to sever quotas thereof as required for the articles to be produced.

I claim:—

1. The combination of a molten glass receptacle having a discharge opening, a shear block fixed relatively to said opening and formed with a passage for the glass and with a flat shearing face intersecting said opening, a movable shear part having a curved cutting edge adapted to engage said shearing surface and traverse said passage, and means for maintaining the movable shear part at an angle to the shearing surface of the shear block with its curved cutting edge bearing against said surface and with the intermediate portion of said curved edge bulging upwardly above the plane of said surface and into said passage, substantially as described.

2. The combination of a molten glass receptacle having a discharge opening, a shear part fixed relatively to said opening, a movable shear part having a cutting edge adapted to coöperate with said fixed part, a pivoted support for the movable shear part, comprising a guideway in which said movable shear part is confined to reciprocate, a baffle at the end of the guideway, and means for exerting force on the pivoted support to maintain the cutting edge of the movable shear part in shearing engagement with the fixed part.

3. The combination of a molten glass receptacle having a discharge opening, a shear part fixed relatively to said opening, and having a bottom shearing surface and a vertical passage alined with said opening and enlarging downwardly therefrom and having its wall spaced from the normal path of the discharging glass, a movable shear part, a movable support for the movable shear part, and a tension device connected to the support and adapted to maintain only the cutting edge of the movable shear part in engagement with the fixed part.

4. The combination of a molten glass receptacle having a discharge opening, a shear part fixed relatively to the opening and having a shearing surface, a movable shear part, a pivoted support for the movable part and a tension device acting on the support to hold the movable part in shearing engagement with the fixed part, and an actuating cylinder and piston mounted on the support and operatively connected to the movable shear part.

5. The combination of a molten glass receptacle having a bottom discharge opening, a shear block having fixed position beneath the receptacle and formed with a vertical passage which constitutes a continuation of the container outlet and with the walls of the shear block passage normally spaced from the path of the discharging glass, a movable shear part having a cutting edge, and means for maintaining said movable part inclined relatively to the shear block with the cutting edge of the movable part in shearing engagement with the under surface of the block.

6. The combination of a molten glass receptacle having a bottom discharge opening, a ring of refractory material defining the outlet of said opening, a metallic shear block having fixed position beneath said ring and having an opening larger than the ring opening and in continuation of the ring and discharge openings whereby the walls of the block are maintained normally out of contact with the glass passing therethrough, said block having a bottom shearing surface, a movable shear part having a cutting edge, and means comprising a constantly acting spring for maintaining said movable shear part with only its cutting edge in scraping engagement with said bottom shearing surface of the block.

7. The combination of a molten glass receptacle having a bottom discharge opening, and a cut-off mechanism for said opening consisting of fixed and movable shear parts, the fixed part open vertically to permit the glass to flow therethrough, the movable shear part being inclined relatively to the fixed part and terminating in an elevated curved cutting edge with said edge adapted to traverse the fixed part and coöperate with the bottom face of the latter in a shearing action, said elevated curved edge bulging upwardly into the opening of said fixed part, and a tension device for maintaining said movable and fixed parts in shearing engagement.

8. The combination of a molten glass receptacle having a bottom discharge opening, and a cut-off mechanism for said opening consisting of fixed and movable shear parts, the fixed part having a passage through which the glass flows with the walls of the passage normally spaced from the path of the discharging glass, said passage terminating in a shearing edge, the movable shear part having a curved cutting edge, and a support for the movable shear part maintaining the same inclined relatively to said face and with said curved edge engaging said shearing edge of the fixed part and bulging upwardly into said passage.

9. The combination of a molten glass receptacle having a bottom discharge opening, and a cut-off mechanism for said opening consisting of fixed and movable shear parts, the fixed part having a vertical passage for the molten glass and with the lower edges of said passage constituting shearing edges, said passage forming a downward continuation of but enlarged with respect to said opening and having its walls normally spaced from the path of the descending glass, the movable shear part having a cutting edge, and means for maintaining the movable shear part with only its cutting edge in sliding engagement with the cutting edges of the fixed shear part.

10. The combination of a molten glass receptacle having a bottom discharge, a shear part secured in fixed relation to said discharge and having a downward passage in continuation of said discharge, said passage enlarging downwardly from the path of the continuous flow of glass discharging therethrough and terminating in a shearing edge at the bottom face of said part, a movable shear part having an elevated front cutting edge coöperating with said edge of the fixed part and movable across the bottom face of said fixed part, and means constantly and yieldingly pressing said movable part upwardly and maintaining said elevated edge in operative engagement with said bottom face.

11. The combination of a molten glass receptacle having a bottom discharge and a ring surrounding the same, a stationary shear block below and supporting said ring, supporting means for said block, said block having a vertical passage in continuation of said discharge, said passage being enlarged beyond the normal path of the glass discharging therethrough and at its lower end terminating in a shear edge, and a movable shear part traversing the under face of said block and having a front shear edge coöperating with said edge of the block, substantially as described.

12. The combination of a molten glass receptacle having a bottom discharge mouth, a stationary shear block, supporting means clamping said block upwardly to said mouth, said block having a vertical passage in downward continuation of said mouth, said passage flaring and enlarging downwardly to an enlarged bottom opening to space the walls of the passage from the path of the glass flowing therethrough, the bottom face of the block and the walls of the passage forming a shear edge, and a movable shear part traversing the bottom face of said block and formed with a front shear edge to coöperate with said edge of the block, substantially as described.

13. The combination of a molten glass receptacle having a bottom discharge, a stationary shear block providing a vertical passage for the flow of glass from said discharge and having a shear edge, a horizontally disposed upwardly inclined blade having its front end grounded approximately from edge to edge of the blade and thus providing an elevated rounded shear edge traversing the under face of the block and cooperating with the shear edge thereof, and means for moving said blade, substantially as described.

14. The combination of a molten glass receptacle having a bottom discharge, a stationary shear block arranged at said discharge and providing a fixed shear edge, a reciprocating head provided with a horizontally disposed blade secured thereon in an upwardly inclined position and formed with an elevated shear edge traversing the bottom face of said block and coöperating with the shear edge thereof, means for reciprocating said head, and a support providing a guideway for said head and a transverse opening in advance of said blade and a baffle in advance of said opening, and comprising means constantly holding said elevated edge upwardly and yieldingly against the bottom face of said block.

15. The combination of a molten glass receptacle having a bottom discharge, a stationary shear block having a passage therethrough for the flow of glass from said discharge, a vertically movable support providing a guideway, a movable shear part confined to said guideway to move in a fixed path with respect to said support, said part having a shear edge traversing the bottom face of said block and coöperating therewith to shear glass depending from said passage, a cylinder carried by said support and provided with a piston connected to said movable shear part to reciprocate the same, and means constantly acting on said support to yieldingly force said part upwardly against said block, substantially as described.

16. The combination of a molten glass receptacle having a bottom discharge, a fixed shear block having a passage therethrough for the flow of glass from said discharge, a support constantly arranged under said block and providing a guideway, a reciprocating head confined to said guideway, said head provided with a shear edge traversing the under surface of said block and coöperating therewith to shear the glass depending therefrom, said support being vertically movable, a cylinder carried by said support and provided with a piston connected to and reciprocating said head, and means yieldingly holding said support upwardly to maintain said edge in shearing engagement with said block.

17. In combination, a molten glass receptacle having a discharge, a shear block having a passage therethrough for the flow of glass from said discharge, a horizontally disposed cylinder provided with a support on which the cylinder is swingable vertically, a guide carried by said cylinder and extending horizontally therefrom below said receptacle, a reciprocating head movable along said guide and constantly pressed upwardly thereby and provided with an edge held to the under face of said block and coöperating therewith to shear the glass flowing through said passage, and a piston in said cylinder connected with said head to reciprocate the same.

18. The combination of a molten glass receptacle, a shear block having a passage therethrough for the flow of glass from said receptacle, a support having a guideway horizontally arranged below said block, a head confined to reciprocate along said guideway and having a fixed path of movement with respect thereto and provided with an elevated shearing edge in constant engagement with the bottom face of said block during the reciprocation of said head, said support being vertically movable and yieldingly upheld to constantly press said edge upwardly against said block, and means for reciprocating said head to cause said edge to traverse said passage and coöperate with said block in severing quotas of glass.

In testimony whereof I affix my signature in presence of two witnesses.

ORVILLE A. BRIDGES.

Witnesses:
C. O. Stewart,
F. A. Riemann, Jr.